United States Patent
Shioiri et al.

(10) Patent No.: US 8,346,099 B2
(45) Date of Patent: Jan. 1, 2013

(54) OPTICAL RECEPTION DEVICE AND OPTICAL RECEPTION METHOD

(75) Inventors: Satomi Shioiri, Tokyo (JP); Kiyoshi Fukuchi, Tokyo (JP)

(73) Assignee: NEC Corporation, Tokyo (JP)

(*) Notice: Subject to any disclaimer, the term of this patent is extended or adjusted under 35 U.S.C. 154(b) by 433 days.

(21) Appl. No.: 12/518,348

(22) PCT Filed: Nov. 29, 2007

(86) PCT No.: PCT/JP2007/073008
§ 371 (c)(1), (2), (4) Date: Jun. 9, 2009

(87) PCT Pub. No.: WO2008/072476
PCT Pub. Date: Jun. 19, 2008

(65) Prior Publication Data
US 2010/0046965 A1 Feb. 25, 2010

(30) Foreign Application Priority Data
Dec. 13, 2006 (JP) .................................. 2006-336135

(51) Int. Cl.
*H04B 10/148* (2006.01)

(52) U.S. Cl. ...................................... 398/209; 398/161

(58) Field of Classification Search .................. 398/202, 398/207, 212, 214, 209, 161
See application file for complete search history.

(56) References Cited

U.S. PATENT DOCUMENTS
2008/0199192 A1* 8/2008 Domagala ...................... 398/208

FOREIGN PATENT DOCUMENTS

| JP | 1990013342 A | 1/1990 |
|----|--------------|--------|
| JP | 1991259632 A | 11/1991 |
| JP | 2658180 B | 6/1997 |
| JP | 1999220443 A | 8/1999 |
| JP | 2001251250 A | 9/2001 |
| JP | 2006039037 A | 2/2006 |
| JP | 2006217605 A | 8/2006 |
| WO | 2006074020 A2 | 7/2006 |

OTHER PUBLICATIONS

International Search Report for PCT/JP2007/073008 mailed Jan. 29, 2008.
C. Rasmussen et al., "DWDM 40G Transmission Over Trans-Pacific Distance (10000 km) Using CSRZ-DPSK, Enhanced FEC, and All-Raman-Amplified 100-km Ultra Wave Fiber Spans", Journal of Lightwave Technology, Jan. 2004, vol. 22, No. 4, p. 203-207.
J. H. Sinsky, et al., "A 40-Gb/s Integrated Balanced Optical Front End and RZ-DPSK Performance", IEEE Photonics Technology Letters, Aug. 2003, vol. 15, No. 8, p. 1135-1137.
Japanese office action in counterpart JP patent application 2008-549240, dated May 31, 2012.
Japanese Office Action for JP2008-549240 issued Feb. 14, 2012.

* cited by examiner

*Primary Examiner* — Leslie Pascal

(57) ABSTRACT

The present invention converts each of the optical differential signals from DPSK demodulator from an optical signal into an electrical signal by using optical-electrical signal converters. Thereafter, each electrical signal is subjected to amplification adjustment at an appropriate amplification factor by variable amplifier, and an appropriate delay amount is added to each electrical signal by variable delay line, and thereafter data discrimination is performed by discriminator. Since two differential signals after DPSK demodulation are subjected to amplitude and delay adjustments, the need for optical parts is obviated enabling the use of electric circuits which can be integrated. Thus, the cost of the optical reception device will be reduced. Moreover, the since electric signals whose phases and amplitudes are equalized are inputted to discriminator, erroneous determination of data at discriminator will be reduced.

4 Claims, 10 Drawing Sheets

(a) (Shift not more than one bit)

(b) Differential signal  (c) Eye waveform (a) (Shift more than one bit)

(b) Differential signal  (c) Eye waveform

OPTICAL RECEPTION DEVICE AND OPTICAL RECEPTION METHOD This application is the National Phase of PCT/JP2007/073008, filed Nov. 29, 2007, which is based upon and claims the priority of Japanese Patent Application No. 2006-336135 filed on Dec. 13, 2006, which is incorporated herein by reference by its entirety.

TECHNICAL FIELD

The present invention relates to an optical reception device and optical reception method utilizing a DPSK demodulation method to demodulate DPSK modulated signals in an ultra-high speed optical communication system.

BACKGROUND ART

Among modulation/demodulation methods used in optical communication systems, the DPSK (Differential Phase Shift Keying) modulation/demodulation method is a modulation/demodulation method having superior reception sensitivity. Therefore the expectation is that the method will be used particularly in long-distance optical communication systems (see, for example, Non-Patent Document 1). Further, in order to draw the most out of the performance of the receiver for performing DPSK demodulation, it is necessary to provide a delay adjuster and a variable attenuator in the subsequent stage of an interferometer in the receiver as shown in FIG. 3 of Non-Patent Document 2.

FIG. 1 is a block diagram to show the configuration of a typical optical reception device using a DPSK demodulation method. It is noted that an optical reception device having a similar configuration to that of the optical reception device shown in FIG. 1 is shown in FIG. 3 of Non-Patent Document 2.

The optical reception device shown in FIG. 1 includes one-bit delay interferometer 130 for receiving an ultra-high speed optical signal of R bps (bits per second) where R is a number of giga-order, delay adjusters 203 and 204 are for adjusting the delay amount of optical signals 201 and 202, variable attenuators 205 and 206 are for adjusting the amplitude of the optical signals where delay amount is adjusted, optical-electrical signal converter (dual PD (photo-detector)) 209 is for converting optical signals 207 and 208 into an electrical signal, amplifier 211 is for amplifying electrical signal 210, and discriminator 213 is for converting electrical signal 212 into digital data.

One-bit delay interferometer 130 is for example a Mach-Zehnder interferometer. One-bit delay interferometer 130 includes optical branching section 131 for bifurcating the inputted light, transmission paths 132 and 133 for delaying one of the two branched signals with respect to the other signal, and directional coupler 134 for causing the two signals to interfere with each other and to be converted into optical intensity signals.

Delay adjusters 203 and 204 adjust to equalize the phases of the two differential signals, which have been outputted from directional coupler 134 in one-bit delay interferometer 130 before being immediately converted into a single signal. Optical variable attenuators 205 and 206 are used to adjust the signal balance (intensity ratio) between a positive component (logic 1) and a negative component (logic 0) of the signal to be inputted to discriminator 213.

Non-Patent Document 1: Christian Rasmussen et. al., "DWDM40G Transmission Over Trans-Pacific Distance (10000 km) Using CSRZ-DPSK, Enhanced FEC, and All-Raman-Amplified 100-km Ultra Wave Fiber Spans," Journal of Lightwave Technology, U.S., January 2004, vol. 22) no. 4, pp. 203-207.

Non-Patent Document 2: Jeffrey H. Sinsky, et. al., "A 40-Gb/s Integrated Balanced Optical Front End and RZ-DPSK Performance, IEEE Photonics Technology Letters," U.S., August 2003, vol. 15, no. 8, pp. 1135-1137.

DISCLOSURE OF THE INVENTION

Problems to be Solved by the Invention

The optical reception device utilizing the DPSK demodulation method shown in FIG. 1 has problem in that the optical reception device is expensive and the configuration thereof is not suitable for reducing the device size.

This is because the optical module used for the DPSK demodulation is made up by assembling optical components including delay adjusters 203 and 204 for adjusting the delay amount of the optical signal and variable attenuators 205 and 206 for adjusting the amplitude of the optical signal. Since the manufacturing process thereof is not suitable for mass production such as of semiconductor integrated circuits, cost reduction through mass production effect cannot be expected. Neither, size reduction by way of miniaturization nor integration such as expected in semiconductor integrated circuits can be expected.

Accordingly, it is an object of the present invention to provide an optical reception device having reduced cost and size, and an optical reception method suitable for reducing cost and size.

Means for Solving the Problems

The optical reception device according to the present invention is characterized by comprising optical-electrical conversion means for converting each differential intensity-modulated light, which has been DPSK demodulated by DPSK demodulation means, into an electrical signal, and amplification means for amplifying each electrical signal, wherein as the amplification means, amplification means capable of setting amplification factors independently of each other is used to equalize the amplitude of each electrical signal.

The optical reception device according to another aspect of the present invention is characterized by comprising optical-electrical conversion means for converting each differential intensity-modulated light, which has been DPSK demodulated by DPSK demodulation means, into an electrical signal, and delay means for providing delay of the electrical signal, wherein as the delay means, delay means capable of providing delay times independently of each other is used to achieve phase matching of each electrical signal.

The optical reception method according to the present invention is characterized by comprising: converting each differential intensity-modulated light which has been DPSK demodulated, into an electrical signal; and amplifying each electrical signal by using amplification means which can independently set each amplification factor, to equalize the amplitude of each electrical signal.

The optical reception method according to another aspect of the present invention is characterized by comprising converting each differential intensity-modulated light which has been DPSK demodulated, into an electrical signal, wherein delay means which can independently provide each delay time is used to achieve phase matching of each electrical signal.

Advantages of the Invention

A first advantage of the present invention is that the cost of the optical reception device can be reduced. The reason for this is that since amplitude adjustment or delay adjustment, or both amplitude adjustment and the delay adjustment of two differential signals after DPSK demodulation are performed, the need to have optical components is obviated and an electric circuit which can be integrated may be used. Such electric circuits are suitable for mass production and therefore it is possible to reduce the cost of the optical reception device that uses them.

A second advantage is that a reduced size optical reception device can be provided. The reason for this is that electronic circuits in the optical reception device can be integrated with the electronic circuits provided before and after the optical reception device.

DESCRIPTION OF SYMBOLS

Figure 1:
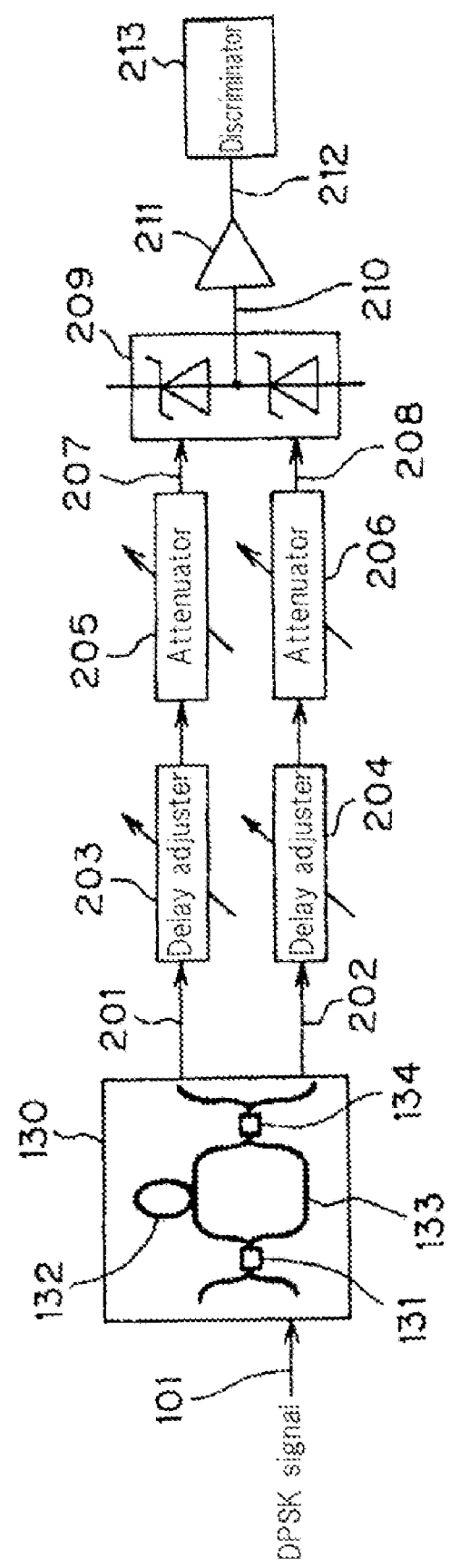
FIG. 1 is a block diagram to show the configuration of a typical optical reception device.

102 DPSK demodulator
105, 106 Optical-electrical signal converter (O/E converter)
109, 110 Variable amplifier
113, 114 Variable delay line
119 Discriminator
130 One-bit delay interferometer
137, 138 PD
13, 140 Trans impedance amplifier (TIA)
143, 144 Automatic gain control amplifier (AGC amplifier)
145, 146 Delay adjuster
150 Differential buffer circuit
151 F/F (flip-flop circuit)
172, 173 TIA with gain adjust function
174, 175 Delay adjuster
179 Control circuit

BEST MODE FOR CARRYING OUT THE INVENTION

Exemplary Embodiment 1

Hereinafter, an exemplary embodiment will be described with reference to the drawings.

Figure 2:
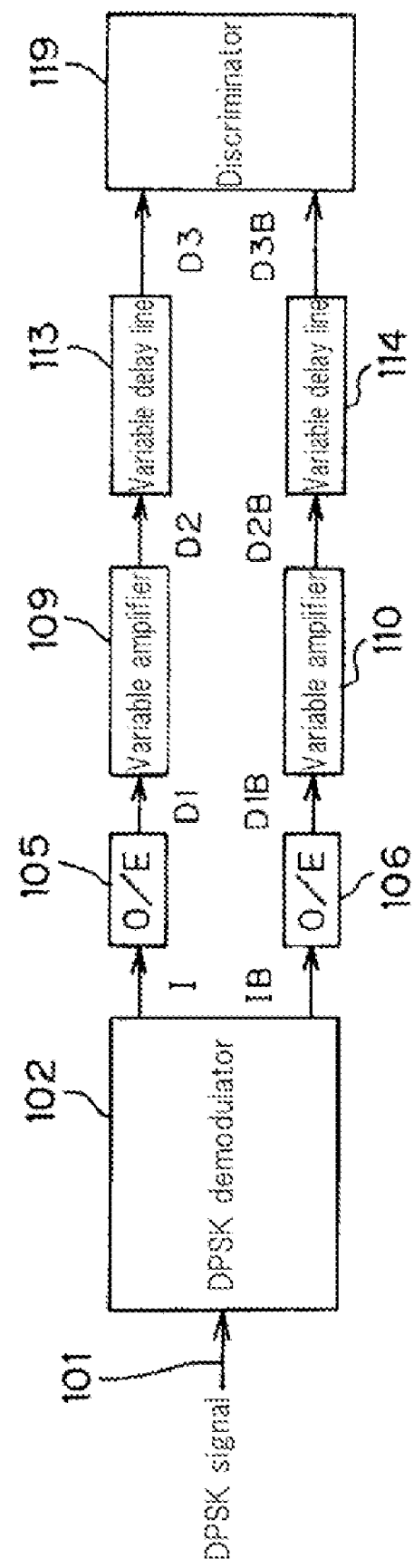
FIG. 2 is a block diagram to show the configuration of the optical reception device of a first exemplary embodiment.

FIG. 2 a block diagram to show the configuration of an optical reception device of a first exemplary embodiment. As shown in FIG. 2, the optical reception device of the first exemplary embodiment includes DPSK demodulator 102, optical-electrical signal converters 105 and 106, voltage variable amplifiers (hereinafter referred to as variable amplifiers) 109 and 110, variable delay lines 113 and 114, and discriminator 119.

DPSK demodulator 102 receives a phase modulated optical signal including phase information (hereinafter referred to as a DPSK signal) transmitted through optical transmission path 101 detects the phase difference between the optical signal and an optical signal in the preceding one-bit period and outputs differential intensity-modulated optical signal I and intensity-modulated optical signal IB corresponding to the phase difference.

Optical-electrical signal converter (O/E converter) 105 receives intensity-modulated optical signal I outputted from DPSK demodulator 102 and outputs electrical signal D1 corresponding to the signal light intensity of intensity-modulated optical signal I Optical-electrical signal converter (O/E converter) 106 receives intensity-modulated optical signal IB outputted from DPSK demodulator 102 and outputs electrical signal D1B corresponding to the signal light intensity of intensity-modulated optical signal IB.

Variable amplifier 109 amplifies electrical signal D1 and outputs amplified electrical signal D2. Variable amplifier 110 amplifies electrical signal D1B and outputs amplified electrical signal D2B. Variable delay line 113 receives electrical signal D2 and outputs delayed electrical signal D3, Variable delay line 114 receives electrical signal D2B and outputs delayed electrical signal D3B. Discriminator 119 discriminates data based on electrical signals D3 and D3B.

Figure 3:
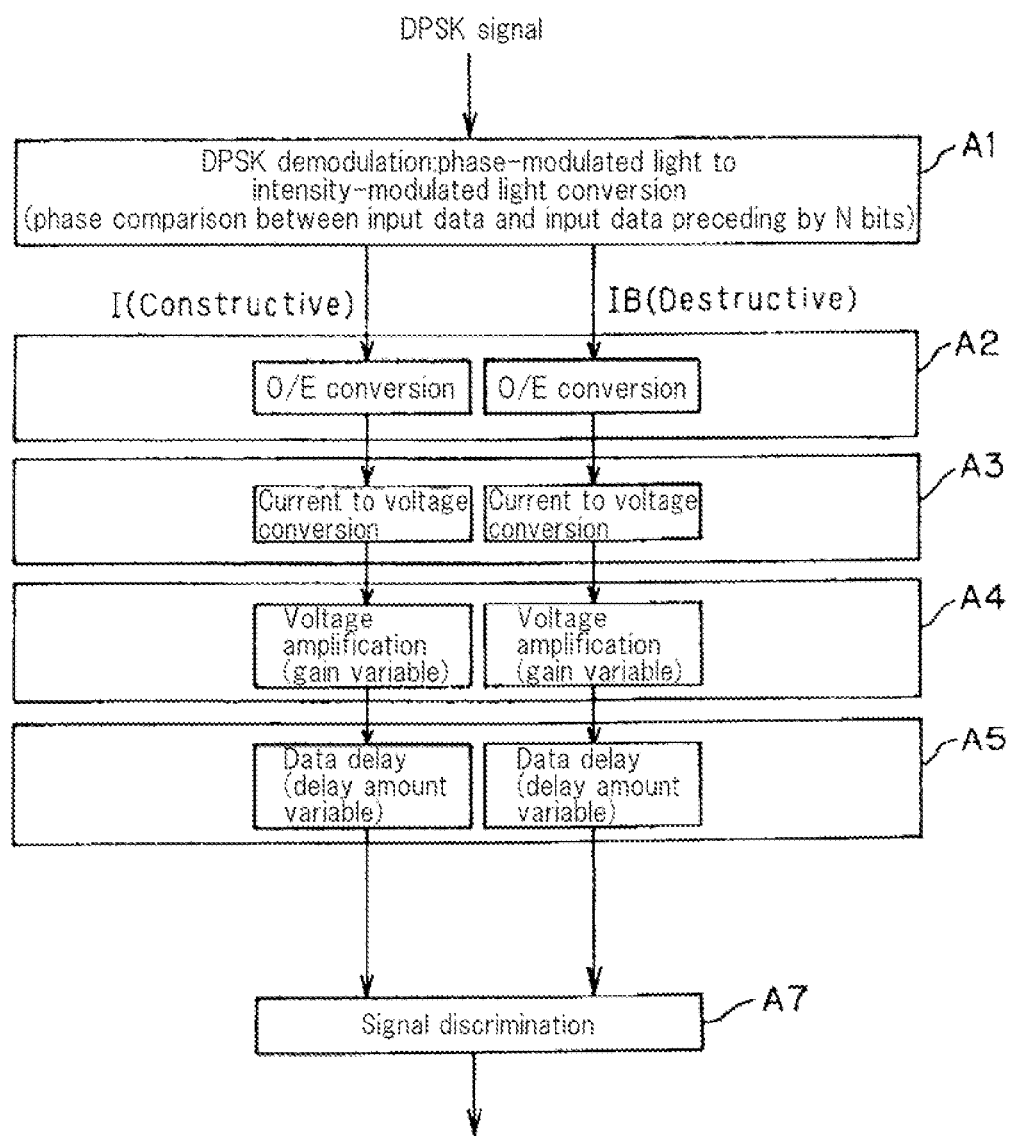
FIG. 3 is a flowchart to show the operation of the optical reception device of the first exemplary embodiment.

Next, the operation of the first exemplary embodiment will be described with reference to FIGS. 2 and 3. FIG. 3 is a flowchart to show the operation of the optical reception device of the first exemplary embodiment.

DPSK demodulator 102 compares the phases of the inputted optical signal and an optical signal in the preceding one-bit period to perform DPSK demodulation, and outputs differential intensity-modulated optical signal I and intensity-modulated optical signal IB (step A1).

DPSK demodulator 102 causes the two signals, between which one-bit delay difference is provided, to interfere with each other and outputs an intensity signal enhanced by the interference (a constructive intensity signal) to one port (a constructive port) and an intensity signal weakened by the interference (a destructive signal) to another pod (a destructive port). FIG. 3 demonstrates a case in which the intensity signal enhanced by the interference is intensity-modulated optical signal I and the intensity signal weakened by the interference is intensity-modulated optical signal IB.

O/E converter 105 and O/E converter 106 separately convert each of differential intensity-modulated optical signals I and IB respectively into electrical signals having current values that correspond to respective optical intensities (step A2).

Electrical signal D1 from O/E converter 105 is inputted to variable amplifier 109, and electrical signal D1B from O/E converter 106 is inputted to variable amplifier 110. Variable amplifier 109 and variable amplifier 110 convert inputted electrical signals D1 and D1B into voltage level signals corresponding to the current values thereof, respectively (step A3).

Further, the voltage amplitudes of the signals are amplified to necessary amplitudes so that the amplitudes are equalized between the two signals which are to be inputted to discriminator 119 in the later stage (step A4). Amplified electrical signals D2 and D2B are respectively inputted to variable delay lines 113 and 114. Variable delay lines 113 and 114 respectively provide necessary delays to inputted electrical signals D2 and D2B such that the phases are equalized between the two signals which are to be inputted to discriminator 119 (step A5). The two signals having equalized phases and amplitudes are inputted to discriminator 119. Discriminator 119 discriminates between 1 and 0 based on the inputted electrical signals (step A7).

In the present exemplary embodiment, phase matching and amplitude adjustment between the two intensity signals after DPSK demodulation are performed in an electric circuit. Therefore, there is no need for a variable delay adjuster to perform delay processing of optical signal and there is no need for an optical variable attenuator to perform adjustment processing of the amplitude of the optical signal. Therefore, it is possible to reduce the cost of the optical reception device compared with one shown in FIG. 1. Further, it is possible to reduce the size of the device through the integration of the electric circuit portion with other semiconductor circuits within the optical reception device.

Example 1

Figure 4:
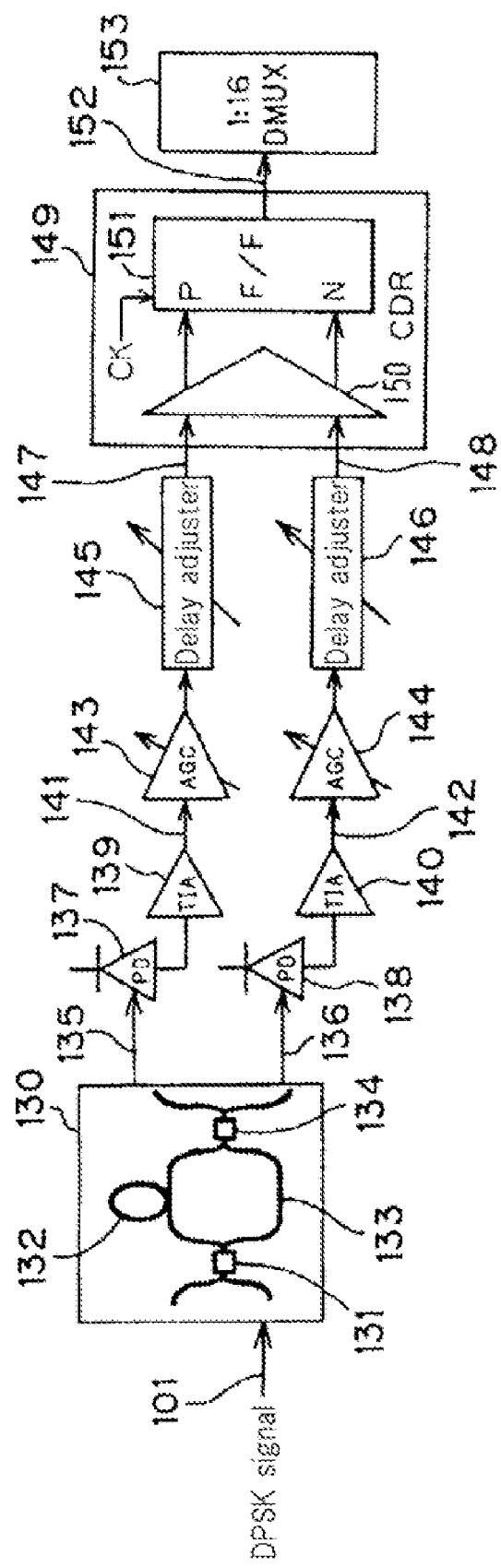
FIG. 4 is a block diagram to show the configuration of the optical reception device of a first example.

Next, a first example will be described with reference to FIG. 4. FIG. 4 is a block diagram to show the configuration of the optical reception device of a first example. FIG. 4 shows a specific configuration example of the optical reception device of the first exemplary embodiment shown in FIG. 2. Suppose that the DPSK signal (a phase modulated optical signal having phase information) to be inputted to the optical reception device is a signal which is optically modulated based on an electrical signal of 40 Gbps. The electrical signal of a 40 Gbps signal is exemplified by a case in which the outputs of 16 encoders are time-division multiplexed to form the signal. Further, the DPSK signal is exemplified by a RZ (Return to zero)-DPSK signal.

In the configuration shown in FIG. 41 the optical reception device includes a DPSK receiver and 1:16 demultiplexer 153 for dividing electrical signal 152 of a 40 Gbps outputted by the DPSK receiver into 16 signals.

The DPSK receiver includes: one-bit delay interferometer 130 as the DPSK demodulator; PDs (photo detectors) 137 and 138 as the optical-electrical converter for converting differential intensity-modulated optical signals 135 and 136 (corresponding to intensity-modulated optical signals I and IB) from one-bit delay interferometer 130 into electrical signals; trans impedance amplifiers (TIAs) 139 and 140 for converting the current signals, which are the outputs of PDs 137 and 138, into voltage signals; automatic gain control (AGC) amplifiers 143 and 144 for amplifying outputs 141 and 142 of TIAs 139 and 140; delay adjusters (variable delay lines) 145 and 146 for providing delays of the electrical signals (corresponding to electrical signals D2 and D2B) which are the outputs of AGC amplifiers 143 and 144; and data recovery unit (CDR Clock and Data Recovery) 149 for receiving the delayed electrical signals (corresponding to electrical signals D3 and D3B) which are the outputs of delay adjusters 145 and 146. CDR 149 includes differential buffer circuit 150, and F/F (flip-flop circuit) 151 with differential inputs as the discriminator to which the outputs of differential buffer circuit 150 are inputted.

One-bit delay interferometer 130 is a Mach-Zehnder interferometer. That is, it includes optical branching section 131 for bifurcating the inputted light, transmission paths 132 and 133 for delaying one of the two branched signals with respect to the other signal, and directional coupler 134 for causing the two signals to interfere with each other and to convert them into optical intensity signals.

Transmission paths 132 and 133 are formed such that the time difference for respective signals to reach directional coupler 134 becomes a one-bit period of the signal, that is, 25 ps (pico seconds). Therefore, at directional coupler 134, a signal is caused to interfere with a signal in the preceding one-bit period. As a result, when the phase of a signal is the same as that of the signal in the preceding one-bit period, a signal resulting from the mutual enhancement between the signals from transmission paths 132 and 133 will be obtained from one output of directional coupler 134.

Moreover, from the other output, a signal resulting from a mutual cancellation of the signals from transmission paths 132 and 133 will be obtained. On the contrary, when the phase is different, a signal resulting from a mutual cancellation of the signals from transmission paths 132 and 133 will be obtained from one output of directional coupler 134, and from the other output, a signal resulting from a mutual enhancement of the signals from transmission paths 132 and 133 will be obtained.

Figures 5, 6:
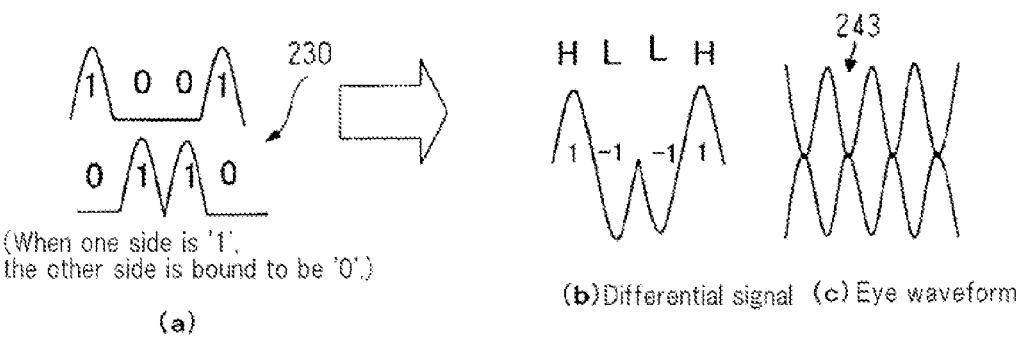
FIG. 5 is a waveform diagram to show waveform examples of each part of an optical reception device.
FIG. 6 is an explanatory diagram to show an ideal electrical signal and an eye waveform example.

Therefore, as shown in FIG. 5, when the phase difference between input signal (DPSK signal) 220 and a signal in the preceding by one-bit period is zero (see bit 221 and bit 222), a high level (bit 226) is obtained from one intensity-modulated optical signal I and a low level (bit 227) is obtained from the other intensity-modulated optical signal IB as the outputs of one-bit delay interferometer 130. Further, when the phase difference with respect to a signal in the preceding by one-bit period is π (see bit 222 and bit 223) opposite differential signals (see bit 228) are obtained.

FIG. 5 is an explanatory diagram to show waveform examples and eye diagrams (eye waveforms) of an ideal optical signal, although, as for the discriminator input, a waveform example and an eye waveform of an electrical signal are shown. Further, there is shown as a waveform example of electrical signal 230, a waveform example of a differential signal corresponding to the difference between the signals inputted to the P-input terminal and the N-input terminal of F/F 151.

In FIG. 5, there are shown on the left side, a waveform example of input light 220 of one-bit delay interferometer 130, a waveform example of output light 224 (see encircled '1' in FIG. 5) of the constructive port a waveform example of output light 225 (see encircled '2' in FIG. 5) of the destructive port, and a waveform example of electrical signal 230 to be inputted to a discriminator (F/F 151 in the present exemplary embodiment).

There are shown, on the right side in FIG. 5, eye waveform 240 of the input light of one-bit delay interferometer 130, eye waveform 241 of the output light of the constructive port of one-bit delay interferometer 130, eye waveform 241 of the output light of the destructive port of one-bit delay interferometer 130, and eye waveform 243 of the electrical signal to be inputted to the discriminator. There is also shown on the right side in FIG. 5 a broken line 245 indicating that the discrimination voltage and the DC value at the discriminator agree with each other.

FIG. 6 is an explanatory diagram to show an ideal waveform example (FIG. 6(*a*)) of electrical signal 230 to be inputted to a discriminator, an ideal waveform example (FIG. 6(*b*)) of a differential signal thereof, and a waveform example (FIG. 6(*c*)) of ideal eye waveform 243 of the electrical signal to be inputted to the discriminator.

Differential intensity-modulated optical signals 135 and 136 from one-bit delay interferometer 130 are transmitted through optical transmission paths and inputted to PDs 137 and 138 respectively, thereafter they are converted into current signals corresponding to optical intensities thereof. The current signals are respectively converted from current signals into voltage signals by TIAs 139 and 140. Further, the voltage signals are amplified by AGC amplifiers 143 and 144. The amplified signals are delayed by delay adjusters 145 and 146, respectively.

Receiving signals 147 and 148 outputted from delay adjusters 145 and 146 as differential inputs, differential buffer circuit 150 in CDR 149 outputs a differentially amplified signal from one output terminal and an inverted signal of the differentially amplified signal from the other output terminal.

The P-input terminal of F/F 151 receives a signal from one output terminal of differential buffer circuit 150, and the N-input terminal receives a signal from the other output terminal of differential buffer circuit 150, F/F 151 outputs logic 1 when the voltage level of the P-input terminal is higher than the voltage level of the N-input terminal, and outputs logic 0 when the voltage level of the P-input terminal is lower than the voltage level of the N-input terminal, for example, at the time of the rise or the fall of a clock signal (CK) recovered by a clock recovery circuit (not shown) in CDR 149.

Figure 7:
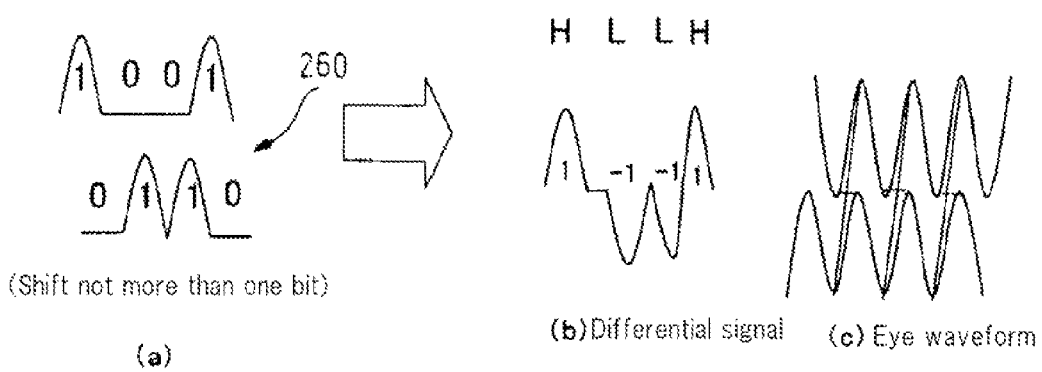
FIG. 7 is an explanatory diagram to show an electrical signal and an eye waveform example before delay adjustment is performed.
Figure 8:
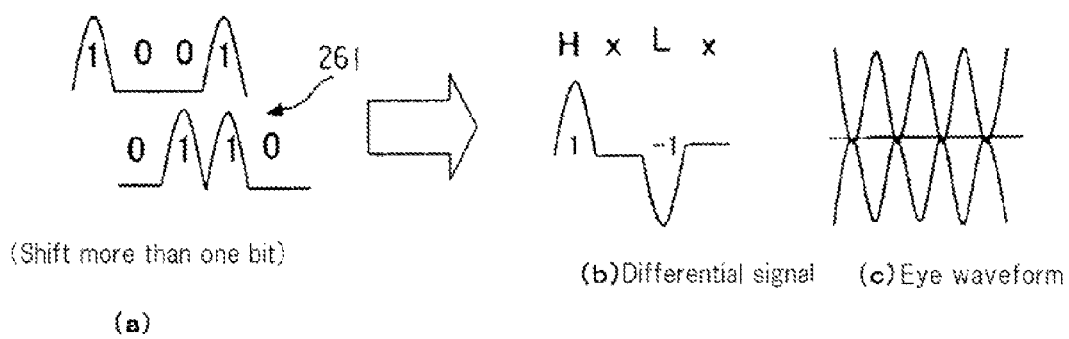
FIG. 8 is an explanatory diagram to show an electrical signal and an eye waveform example before the delay adjustment is performed.
Figure 9:
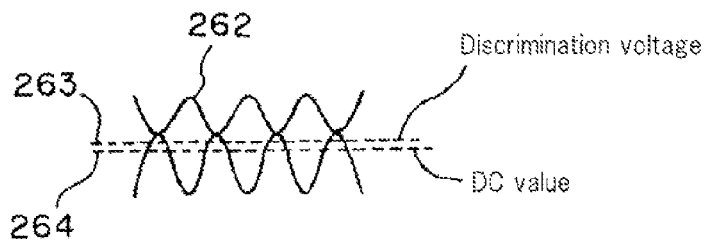
FIG. 9 is an explanatory diagram to show an electrical signal and an eye waveform example before gain adjustment is performed.

FIGS. 7 and 8 are explanatory diagrams to show waveform examples of the electrical signals to be inputted to the discriminator (FIG. 7(*a*) and FIG. 8(*a*)), waveform examples of the differential signals (FIG. 7(*b*) and FIG. 8(*b*)), and eye waveform examples (FIG. 7(*c*) and FIG. 8(*c*)) when there are variations in transmission delay in the two transmission paths from the output of one-bit delay interferometer 130 to F/F 151. FIG. 9 is an explanatory diagram to show an eye waveform when there are variations in the amplitudes of two electrical signals to be inputted to the discriminator.

When there are variations in transmission delay in the two transmission paths from the output of one-bit delay interferometer 130 to F/F 151, the waveform and eye waveform of the electrical signal to be inputted to F/F 151 will become like the waveform example and the eye waveform of electrical signal 260 shown in FIG. 7, or the waveform example and the eye waveform of electrical signal 261 shown in FIG. 8.

In electrical signal 260, since a shift has occurred within a one bit period, when the difference between the two signals is taken into the consideration, the eye waveform is distorted, the discrimination margin at F/F 151 is narrowed, and a characteristic degradation of the receiver takes place. In eye waveform 261, since the delay is not less than one bit period, the differential relationship between the two signals is not maintained and there occurs a case in which both signals are 1 or 0 resulting in a signal of 0 level while the signal is intrinsically 1 or −1. That is, signal errors occur (see 'x' in FIG. 8(*b*)).

Accordingly, adjustment is performed by using delay adjusters 145 and 146 so as to eliminate shifts as shown in FIGS. 7 and 8. That is, the delay amounts of delay adjusters 145 and 146 are adjusted so that there is an agreement between the phases of signal 147 and signal 148 which are to be inputted to CDR 149. As the result, the difference between signals 147 and 148 to be inputted to CDR 149 becomes normal as shown by eye waveform 243 shown in FIG. 6.

As an example, when the length of transmission path 135 is larger than that of transmission path 136, the signal to be inputted to delay adjuster 145 is delayed with respect to the signal to be inputted to delay adjuster 146. In such a case, the variable delay line as delay adjuster 146 is made longer than the variable delay line as delay adjuster 145 to delay the signal to be inputted to delay adjuster 146 so that a phase agreement between signal 147 and signal 148 is achieved.

Further, when there are variations of transmission loss in the two transmission paths from the output of one-bit delay interferometer 130 to F/F 151 as and where, variations of the conversion efficiency of PDs 137 and 138 occur, and where there is difference between the gains of TIAs 139 and 140, the eye waveform may become like eye waveform 262 which has a variation in amplitude as shown in FIG. 9.

In that case, there is possibility that an error occurs in the data discrimination at F/F 151. Accordingly, in this example, AGC amplifiers 143 and 144 are used to add a gain to each signal such that upper and lower peak values agree with each other. For example, the gains of AGC amplifiers 143 and 144 are set such that the amplitudes of signals 147 and 148 agree with each other by observing the amplitudes with equipment such as a sampling oscilloscope etc.

It is noted that the installation positions of variable delay lines 145 and 146 and AGC amplifiers 143 and 144 may be reversed.

Example 2

Figure 10:
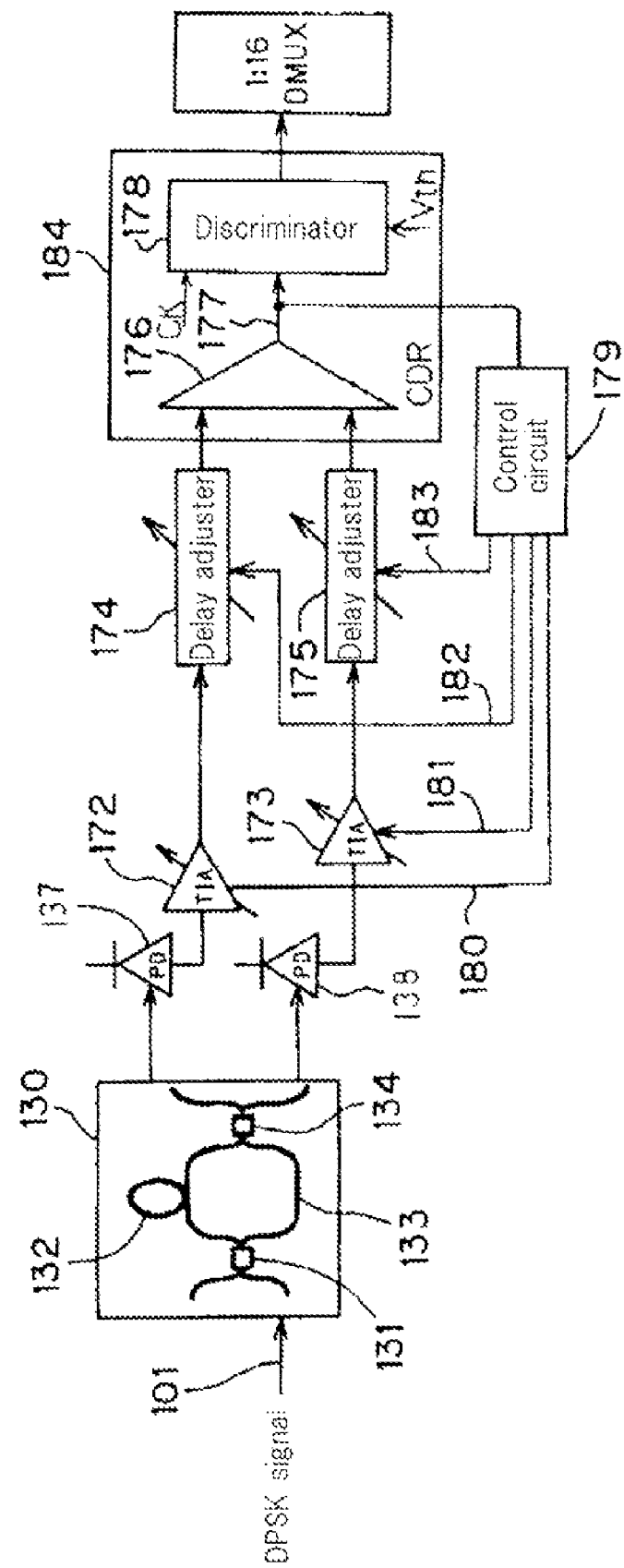
FIG. 10 is a block diagram to show the configuration of the optical reception device of a second example.

Next, a second example will be described with reference to FIG. 10. FIG. 10 is a block diagram to show the configuration of the optical reception device of a second example. In the second example, TIAs 172 and 173 with a gain adjustment function are used without using AGC amplifiers. Moreover, delay adjusters 174 and 175 which can change the delay amount in response to the control signal from outside are used.

It is noted that, in the second example, CDR 184 which includes differential buffer circuit 176 of a single output and discriminator 178 is used. Discriminator 178 samples signal 179 to be outputted by differential buffer circuit 176 at a clock signal recovered by a clock recovery circuit (not shown) in CDR 184 and, for example, when the sampled value is higher than a threshold Vth, outputs logic 1 and when it is not higher than the threshold, outputs logic 0. It is noted that threshold Vth is DC value 245 shown in FIG. 5.

Further, there is provided control circuit 179 for receiving the signal outputted by differential buffer circuit 176. When there occurs variations of transmission loss in the two transmission paths from the output of one-bit delay interferometer 130 to discriminator 178, and when variations of the conversion efficiency of PDs 137 and 138, and the like occur, the eye waveform may become like eye waveform 262 which has a variation in amplitude as shown in FIG. 9.

That is, DC value 264 of the signal and optimum discrimination voltage 263 are different. In that case, it becomes necessary to control the discrimination voltage in response to changes of eye waveform, that is, waveform changes of the input signal to discriminator 178. Accordingly, control circuit 179 outputs control signals 180 and 181 to set the gains of TIAs 172 and 173 such that the amplitudes of the electrical signals to be outputted agree with each other.

Such adjustment will make it possible to obtain eye waveform 243 shown in FIG. 6, in which the DC voltage of the signal agrees with the discrimination voltage. It is noted that control circuit 179 corresponds to amplification factor setting means for monitoring the waveform information of the input signal to discriminator 178 to set the amplification factors of TIAs 172 and 173.

Figure 11:
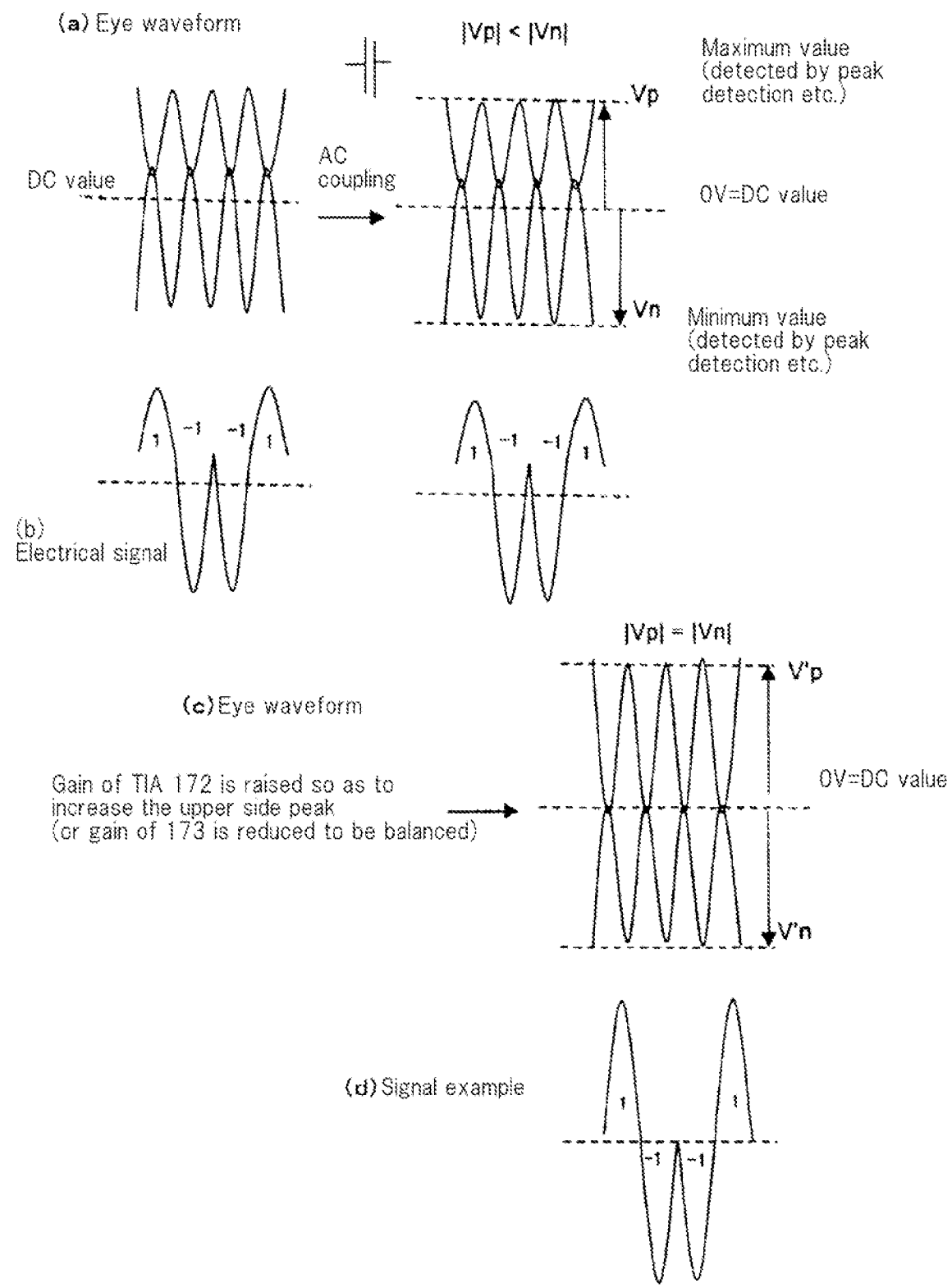
FIG. 11 is an explanatory diagram to illustrate the amplitude adjustment in the second example.

As a specific example, suppose that as shown in FIGS. 11(*a*) and 11(*b*), the electrical signal to be inputted to CDR 184 and the eye waveform are as shown in FIG. 11. In the example shown in FIG. 11, one electrical signal (upper-side electrical signal) has a smaller amplitude than the other electrical signal (lower-side electrical signal). Control section 179 can determine which electrical signal has a larger amplitude by comparing maximum value Vp and minimum value Vn of signal 177 with the DC value. It is noted that control section 179 includes a peak detector.

Although it is possible to obtain the DC value by detecting the average value of signal 177, since simply performing AC coupling of signal 177 to be inputted to control section 179 will result in DC value=0 V, in such a case, control section 179 can determine which electrical signal has a larger amplitude by comparing maximum value Vp with minimum value Vn.

Further, in order to make the amplitudes of the two electrical signals agree with each other, control section 179 outputs control signal 180 so as to increase the gain of TIA 172 on the side that outputs an electrical signal having a smaller amplitude, or control section 179 outputs control signal 181 so as to decrease the gain of TIA 173 on the side that outputs an electrical signal having a larger amplitude. As a result, as shown in FIG. 11(*c*), eye waveforms of the signals to be inputted to CDR 184 are equalized. That is, as shown in FIG. 11(*d*), the signal which provides a source of signal sequences to be discriminated at discriminator 178 will become an ideal signal.

Further, control circuit 179 outputs control signals 182 and 183 to adjust the delay amounts of delay adjusters 174 and 175 such that a phase agreement between the two electrical signals to be inputted to CDR 184 will be achieved. As a result, the phase difference between the two electrical signals to be inputted to CDR 184 becomes normal as shown by eye waveform 243 shown in FIG. 6. It is noted that control circuit 179 corresponds to the delay time setting means for monitoring the waveform information of the input signal to discriminator 178 to set the delay times of delay adjusters 174 and 175.

Figure 12:
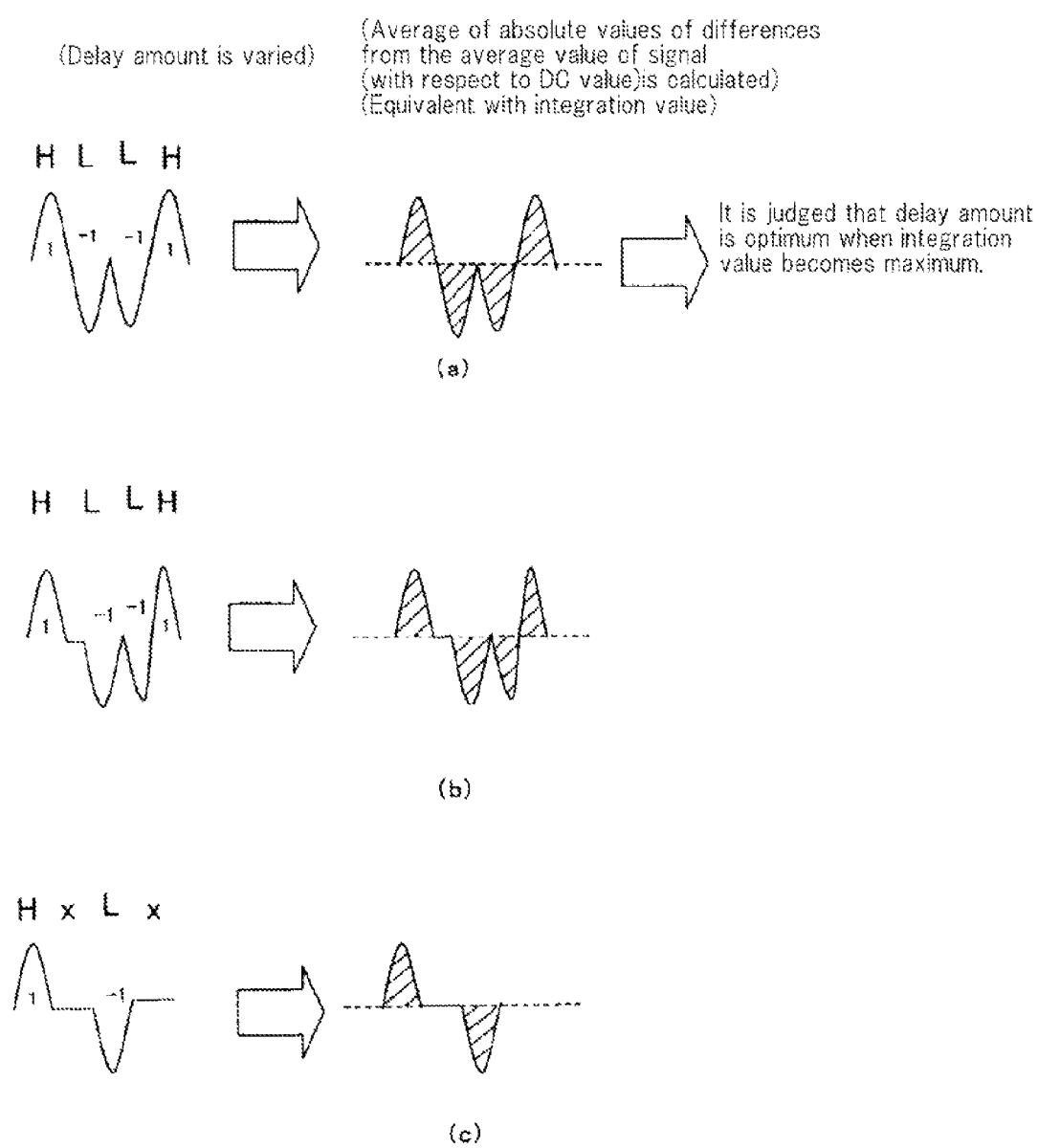
FIG. 12 is an explanatory diagram to illustrate the delay adjustment in the second example.

Specifically, in the initial state of the system, as shown in FIG. 12, control circuit 179 performs the integration of signal 177 (which corresponds to the hatched portion) while varying the delay amounts of delay adjusters 174 and 175. Thus, the average of the absolute values of the differences from the average value of signal 177 is calculated.

Further, control circuit 179 judges that the delay amount when the integration value becomes maximum is an optimum delay amount, and thereafter fixes the delay amount. It is noted that when the phases of the two electrical signals are shifted, as shown in FIGS. 12(*b*) and 12(*c*), the integration value will be decreased. Further, control circuit 179 varies the delay amounts of delay adjusters 174 and 175 within the range of the expected amount of phase shift.

Figure 13:
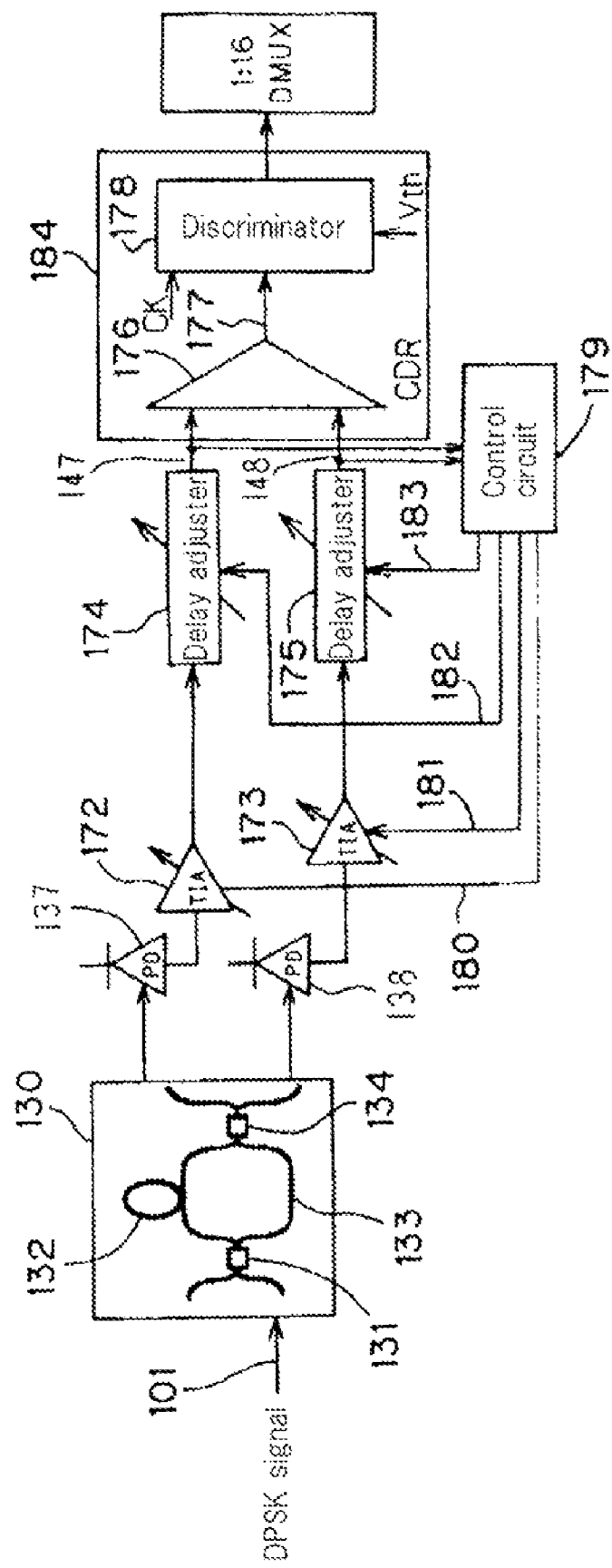
FIG. 13 is a block diagram to show a variant of the optical reception device of the second example.

Further, as shown in FIG. 13, control circuit 179 may be configured so that the amplification factors of TIAs 172 and 173 are set such that the amplitudes of the two electrical signals 147 and 148 to be inputted to CDR 184 agree with each other. When configured in this way, in the initial state of the system, control circuit 179 outputs control signals 180 and 181 for setting the amplification factors of the TIAs 172 and 173 to TIAs 172 and 173 such that the amplitudes of the two electrical signals 147 and 148 agree with each other.

Further, control circuit 179 performs integration of the portion where there are differences in the level between two electrical signals 147 and 148 (portion where one signal is on the upper side and the other is the lower side with respect to 0 V) while varying the delay amounts of delay adjusters 174 and 175 and judges that the delay amount when the integration value is maximum is the optimum delay amount. That is, for example, the delay amount, when the integration value of the output of an EXOR circuit having electrical signals 147 and 148 as the input, becomes maximum, is judged as the optimum delay amount.

Due to the configuration as describe above, when the present invention is configured such that differential intensity-modulated optical signals are outputted D from a delay interferometer as the DPSK demodulator, and such that the differential intensity-modulated optical signals are converted into differential electrical signals by an O/E converter, it is arranged that electrical signals whose phases and amplitudes are equalized are inputted to the CDR even when the phase and amplitude of differential electrical signals may be shifted in the transmission paths to the CDR. Therefore, it is possible to reduce erroneous determination of data at the discriminator.

Though, the present invention has been described with reference to an exemplary embodiment (and examples), the present invention will not be limited to the above described exemplary embodiment (and examples), and various modifications which can be understood by a person skilled in the art can be made to the configuration and details of the present invention within the scope thereof.

This application claims the priority of Japanese Patent Application No. 2006-336135 filed on Dec. 13, 2006, which is incorporated herein by reference by its entirety.

The invention claimed is:

1. An optical reception device in an optical reception system utilizing a DPSK modulation/demodulation method, said optical reception device characterized by comprising:
    DPSK demodulation means for performing DPSK demodulation through comparison with an optical signal in the preceding one-bit period;
    optical-electrical conversion means for converting each of differential intensity-modulated lights, which have been DPSK demodulated by said DPSK demodulation means, into two electrical signals;
    delay means for providing a delay of an electrical signal; and
    amplification means for amplifying each electrical signal, wherein
    as said amplification means, amplification means which can independently set each amplification factor is used to equalize the amplitude of each electrical signal;
    as said delay means, two delay means provided for each electrical signal individually, and which can independently provide each delay time used to achieve phase matching of each electrical signal, and
    amplification factor setting means for monitoring waveform information of an input signal of discrimination means for performing data discrimination based on each electrical signal to set an amplification factor of said amplification means.

2. An optical reception device in an optical reception system utilizing a DPSK modulation/demodulation method, said optical reception device characterized by comprising:
    DPSK demodulation means for performing DPSK demodulation through comparison with an optical signal in the preceding one-bit period;
    optical-electrical conversion means for converting each of the differential intensity-modulated lights, which have been DPSK demodulated by said DPSK demodulation means, into two electrical signals;

delay means for providing a delay of an electrical signal, wherein as said delay means, two delay means provided for each electrical signal individually, and which can independently provide each delay time used to achieve phase matching of each electrical signal; and delay time setting means for monitoring waveform information of an input signal of discrimination means for performing data discrimination based on each electrical signal to set a delay time of said delay means.

3. An optical reception method used in an optical reception system utilizing a DPSK modulation/demodulation method, said optical reception method characterized by comprising:

performing DPSK demodulation through comparison with an optical signal in the preceding one-bit period;

converting each of the differential intensity-modulated lights which have been DPSK demodulated, into two electrical signals; and amplifying each electrical signal by using amplification means which can independently set each amplification factor, to equalize the amplitude of each electrical signal, wherein two delay means are provided for each electrical signal individually, and which can independently provide each delay time used to achieve phase matching of each electrical signal, wherein waveform information of an input signal of discrimination means for performing data discrimination based on each electrical signal is monitored to set an amplification factor of said amplification means.

4. An optical reception method used in an optical reception system utilizing a DPSK modulation/demodulation method, said optical reception method characterized by comprising:

performing DPSK demodulation through comparison with an optical signal in the preceding one-bit period; and converting each of the differential intensity-modulated lights which have been DPSK demodulated, into two electrical signals, wherein two delay means are provided for each electrical signal individually, and which can independently provide each delay time used to achieve phase matching of each electrical signal, wherein waveform information of an input signal of discrimination means for performing data discrimination based on each electrical signal is monitored to set a delay time of said delay means.

* * * * *